(12) United States Patent
Schessel

(10) Patent No.: US 6,418,215 B1
(45) Date of Patent: *Jul. 9, 2002

(54) FLEXIBLE SOFTWARE ARCHITECTURE FOR A CALL PROCESSING SYSTEM

(75) Inventor: Larry Edward Schessel, Boca Raton, FL (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/838,209

(22) Filed: Apr. 16, 1997

Related U.S. Application Data

(63) Continuation of application No. 08/656,995, filed on May 24, 1996, now abandoned, and a continuation of application No. 08/538,167, filed on Aug. 23, 1995, now abandoned, and a continuation of application No. 08/335,924, filed on Nov. 8, 1994, now abandoned, and a continuation of application No. 08/184,740, filed on Jan. 21, 1994, now abandoned, and a continuation of application No. 07/906,957, filed on Jun. 30, 1992, now abandoned.

(51) Int. Cl.$^7$ ............................................... H04M 3/42
(52) U.S. Cl. ........................... 379/207.02; 379/201.01; 379/244; 379/201.03; 709/220
(58) Field of Search ................................. 379/242, 243, 379/244, 201, 201.01, 201.03, 207.02; 709/220–223, 225, 226, 228–230

(56) References Cited

U.S. PATENT DOCUMENTS 4,782,517 A * 11/1988 Bernardis et al. ............ 379/201
4,907,259 A * 3/1990 Frech ........................... 379/201
5,222,125 A * 6/1993 Creswell et al. ............. 379/201

FOREIGN PATENT DOCUMENTS

EP          0228053        7/1987

OTHER PUBLICATIONS

"Designing Service–Independent Capabilities for Intelligent Networks" Bauer et al., IEEE Communications Magazine, Dec. 1988, pp 31–41.*
"Intelligent Network: A Distributed System", Head, IEEE Communication Magazine, Dec. 1988 pp. 16–20, 63.*
"Methods of Addressing the Interactions of Intelligent Network Services with Embedded Switch Services," Honayoon et al., IEEE Communications Magazine Dec. 1988, pp. 42–46.*
"Intelligent Network Feature Transaction Interface", Pinkham, IEEE Communications Magazine, Dec. 1988, pp. 47–52.*
S. Gill, "Building a User Friendly Service Creation Environment", Proceedings of the National Communications Forum, vol. 43, No. 1 (Oct. 2–4, 1989), pp. 345–350.
J.M. Ginsparg et al. "Automatic Programming of Communications Software Via Nonprocedural Descriptions", IEEE Transactions on Communications, vol. COM–30, No. 6 (Jun. 1982), pp. 1343–1347.
H. Shirasu et al. "Innovative Approach to Switching Software Design Using Dataflow Concept", Proceeding International Switching Symposium, vol. 2 (Mar. 15–20, 1987), pp. 303–307.

* cited by examiner

Primary Examiner—Fan Tsang
Assistant Examiner—Roland G. Foster
(74) Attorney, Agent, or Firm—Brian K. Johnson

(57) ABSTRACT

A method of introducing a feature during a communication between subscribers of a telecommunications network. The first step of the method is executing, at each predefined trigger point during the communication, an operation to activate a particular requested feature. The method then requires accessing data stored in a network memory for use in the activation operation. The data is arranged in the memory in table and bit map format so as to enable the features to be customized. The method then requires executing the particular requested feature upon activation. The method may also include repeating the method steps for each feature available to be activated at a respective trigger point in an order determined by the stored data. The method is independent of the type of requested feature.

9 Claims, 15 Drawing Sheets

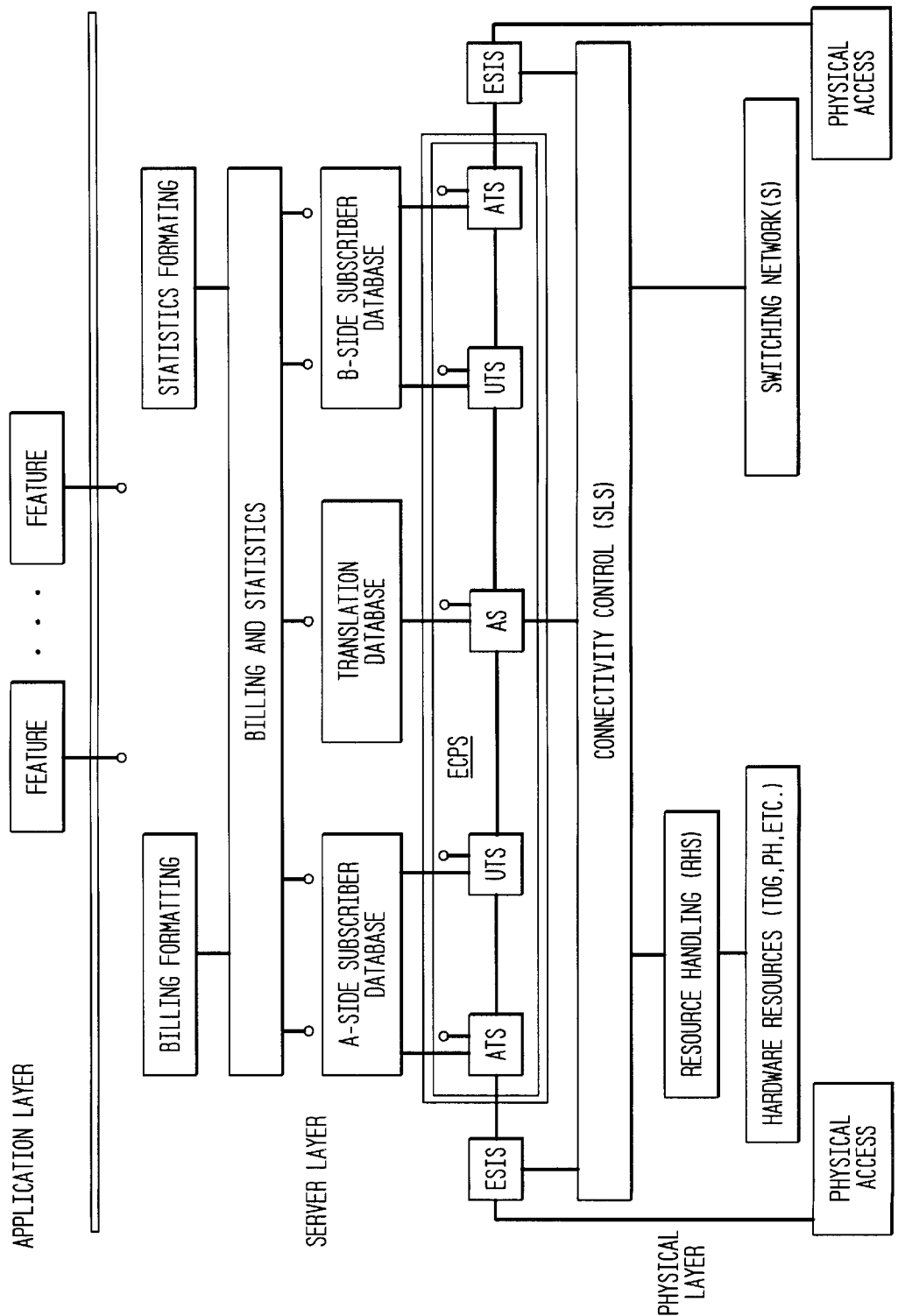

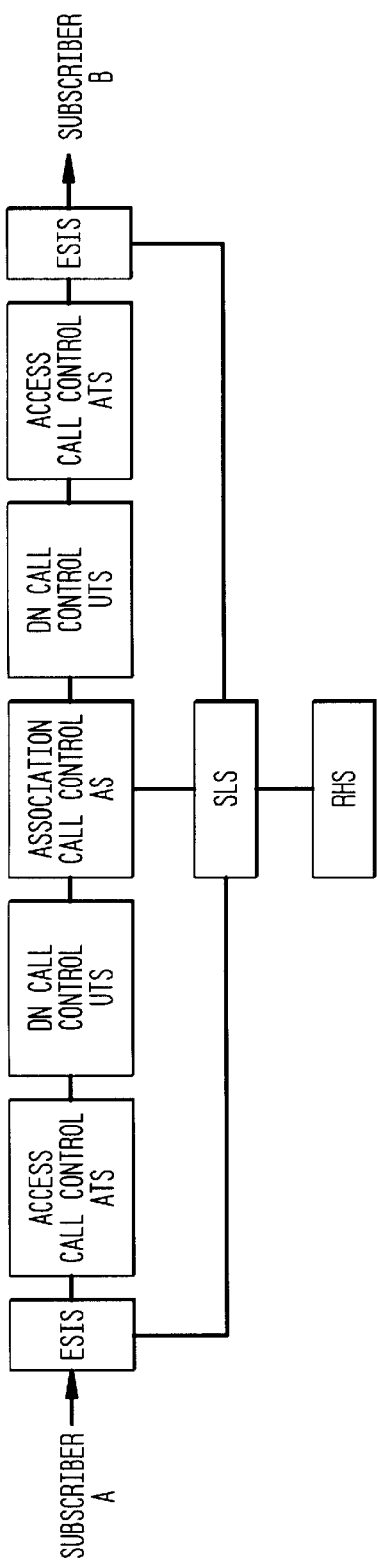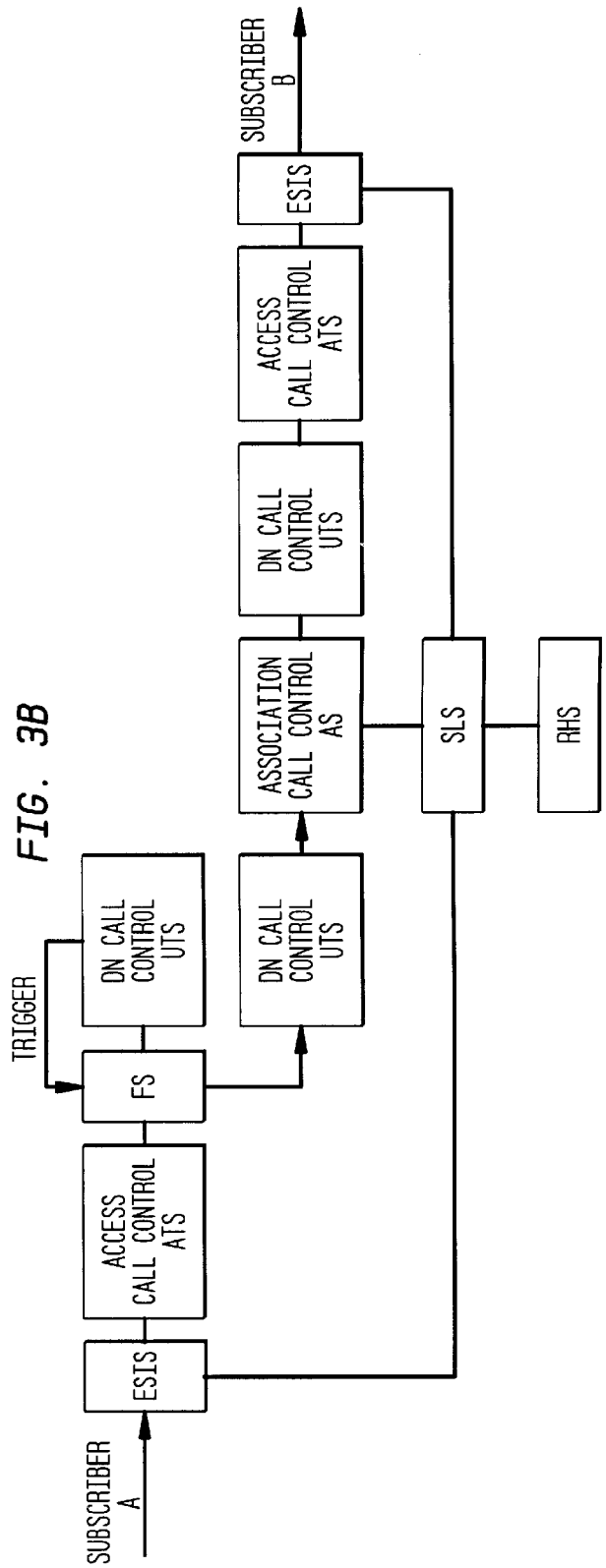

FIG. 5

FEATURES (in priority order)

|  | F1 F2 F3 F4 F5 · · · Fn |
|---|---|
| F1 | Bit map representing specific feature interaction between F1 and above features (depending on table) |
| F2 | · · · · · |
| · | · |
| Fn | · · · · · |

FEATURES (in priority order)

FIG. 6

FEATURES (in priority order)

F1 F2 F3 F4 F5 · · · Fn

| Trigger Point Identity (Tx) | |
|---|---|
| T1 | Bit map indicating whether above fature (Fx) can trigger at this specific Trigger Point (T1) |
|  | Data per feature indicating action to take if feature above does trigger (i.e. operation) |
| T2 | · · · · · |
| Tn | · · · · · |

FIG. 7

FEATURES (in priority order)

F1 F2 F3 F4 F5 · · · Fn

Bit map representing specific features

FIG. 8C

INITIAL CONDITION: A-party is busy with a call and subscribes to DND, CF, and CW. An operator activates AEO and calls the A-party (i.e. AEO has set a persistent trigger condition at the "SUBSCRIBER BUSY" trigger point).

TRIGGER POINT: SUBSCRIBER BUSY (A-party)

STEP (1) Determine features which could trigger at this trigger point based on Trigger Point Table, subscribed features, requested features and persistent features.

| SUBSCRIBER BUSY TRIGGER POINT ROW | N | Y | Y | Y |
|---|---|---|---|---|

AND

| SUBSCRIBER FEATURE BITMAP | N | Y | Y | Y |
|---|---|---|---|---|

OR

| PERSISTENT FEATURE BITMAP | Y | N | N | N |
|---|---|---|---|---|

| RESULT | Y | N | N | N |
|---|---|---|---|---|

FIG. 8D

STEP (2) Block features based on active features.

The RESULT above remains unchanged since there are no active features on the called line.

FIG. 8E

STEP (3a) DO WHILE there are features to trigger

SEARCH (RESULT bit map) = AEO (AEO is most significant bit set to Y)

STEP (3b) Trigger highest priority feature (based on Trigger Point Table lookup)

Based on trigger point table entry for the AEO, feature operation 1 is performed; AEO software is triggered which controls termination to the A-party.

STEP (3c) Block features based on newly triggered feature

| OLD RESULT | Y | Y | Y | Y |
|---|---|---|---|---|

AND

| AEO TRIGGERED FEATURE BLOCKING ROW | N | N | N | N |
|---|---|---|---|---|

| NEW RESULT | N | N | N | N |
|---|---|---|---|---|

At this point the NEW RESULT bit map is empty indicating no further feature triggers are required

*FIG. 8F*

```
FEATURE PRIORITY LIST (1 being highest priority)

1    Attendant Emergency Override (AEO)
    2    Do Not Disturb (DND)
    3    Call Forwarding (CF)
    4    Call Waiting (CW)
```

*FIG. 8G*

SUBSCRIBER FEATURE BITMAP

| AEO | DND | CF | CW |
|-----|-----|----|----|
| N   | Y   | Y  | Y  |

*FIG. 8H*

TRIGGERED FEATURE BLOCKING TABLE

|     | AEO | DND | CF | CW |
|-----|-----|-----|----|----|
| AEO | N   | N   | N  | N  |
| DND | Y   | N   | N  | N  |
| CF  | Y   | Y   | N  | N  |
| CW  | Y   | Y   | Y  | N  |

'N' IMPLIES FEATURE IS BLOCKED

*FIG. 8I*

TRIGGER POINT TABLE

| | AEO | DND | CF | CW |
|---|---|---|---|---|
| | N | Y | Y | Y |
| TRIGGER PT SUBSCRIBER BUSY | SUPPORTING DATA<br>AEO: action=1<br>DND: action=1<br>CF: action=1<br>CW: action=1 | | | | action 1 = Trigger Related Feature

FIG. 10A

| FEATURE PRIORITY (1 BEING HIGH PRIORITY) | FEATURE |
|---|---|
| 1 | MANUAL LINE (HOTLINE) |
| 2 | VOICE DATA PROTECTION (VDP) |
| 3 | ATTENDANT EMERGENCY OVERRIDE (AEO) |
| 4 | DENIED TERMINATION (DT) |
| 5 | DO NOT DISTURB (DND) |
| 6 | NOT MAKE BUSY KEY (NMBK) |
| 7 | CALL FORWARD INHIBIT MAKE BUSY (CFIMB) |
| 8 | MAKE BUSY KEY (MBK) |
| 9 | CALL FORWARD INHIBIT LINE BUSY (CFILB) |
| 10 | DIAL CALL WAITING (DCW) |
| 11 | SELECTIVE CALL FORWARD (SCF) |
| 12 | CALL FORWARD VARIABLE (CFV) |

FIG. 10B

FEATURES (IN PRIORITY ORDER)

| | 1 | 2 | 3 | 4 | 5 | 6 | 7 | 8 | 9 | 10 | 11 | 12 |
|---|---|---|---|---|---|---|---|---|---|---|---|---|
| FEATURE POSSIBLE | Y | Y | Y | Y | Y | Y | Y | Y | Y | Y | Y | Y |

FIG. 10C

FEATURES (IN PRIORITY ORDER)

| | 1 | 2 | 3 | 4 | 5 | 6 | 7 | 8 | 9 | 10 | 11 | 12 |
|---|---|---|---|---|---|---|---|---|---|---|---|---|
| SUBSCRIBER FEATURE | N | N | N | N | N | N | N | N | N | N | N | Y |

FIG. 10D

Features (in priority order)

|   |        | 1 | 2 | 3 | 4 | 5 | 6 | 7 | 8 | 9 | 10 | 11 | 12 |
|---|--------|---|---|---|---|---|---|---|---|---|----|----|----|
| 1 | HOTLINE|   |   |   |   |   |   |   |   |   |    |    |    |
| 2 | VDP    |   |   |   |   |   |   |   |   |   |    |    |    |
| 3 | AEO    |   |   |   |   |   |   |   |   |   |    |    |    |
| 4 | DT     |   |   |   |   |   |   |   |   |   |    |    |    |
| 5 | DND    |   |   |   |   |   |   |   |   |   |    |    |    |
| 6 | NMBK   |   |   |   |   |   |   |   |   |   |    |    |    |
| 7 | CFIMB  | Y | Y | Y | N | Y | Y | Y | Y | N | Y  | Y  | Y  |
| 8 | MBK    | Y | Y | Y | Y | Y | Y | Y | Y | Y | Y  | Y  | Y  |
| 9 | CFILB  |   |   |   |   |   |   |   |   |   |    |    |    |
| 10| DCW    |   |   |   |   |   |   |   |   |   |    |    |    |
| 11| SCF    |   |   |   |   |   |   |   |   |   |    |    |    |
| 12| CFV    | N | Y | Y | N | Y | Y | Y | Y | Y | Y  | Y  | Y  |

FIG. 10E

| Feature Possible (initial condition) | = | Y Y Y Y Y Y Y Y Y Y Y Y Y Y Y Y |
|---|---|---|

AND

| cfv Admin Blck Tble entry | = | N Y Y N Y Y Y Y Y Y Y Y Y Y Y Y |
|---|---|---|

| RESULT (Feat Possible) | = | N Y Y N Y Y Y Y Y Y Y Y Y Y Y Y |
|---|---|---|

FIG. 10F

Features (in priority order)

|    |         | 1 | 2 | 3 | 4 | 5 | 6 | 7 | 8 | 9 | 10 | 11 | 12 |
|----|---------|---|---|---|---|---|---|---|---|---|----|----|----|
| 1  | HOTLINE |   |   |   |   |   |   |   |   |   |    |    |    |
| 2  | VDP     |   |   |   |   |   |   |   |   |   |    |    |    |
| 3  | AEO     |   |   |   |   |   |   |   |   |   |    |    |    |
| 4  | DT      |   |   |   |   |   |   |   |   |   |    |    |    |
| 5  | DND     |   |   |   |   |   |   |   |   |   |    |    |    |
| 6  | NMBK    |   |   |   |   |   |   |   |   |   |    |    |    |
| 7  | CFIMB   | Y | Y | Y | Y | Y | Y | Y | N | Y | Y  | Y  | N  |
| 8  | MBK     | Y | Y | Y | Y | Y | Y | Y | Y | Y | Y  | Y  | Y  |
| 9  | CFILB   |   |   |   |   |   |   |   |   |   |    |    |    |
| 10 | DCW     |   |   |   |   |   |   |   |   |   |    |    |    |
| 11 | SCF     |   |   |   |   |   |   |   |   |   |    |    |    |
| 12 | CFV     | Y | Y | Y | Y | Y | Y | Y | Y | Y | Y  | Y  | Y  |

FIG. 10G

CFIMB Mutually Inc Tble Entry = | Y | Y | Y | Y | Y | Y | Y | N | Y | Y | N | Y | Y | Y | Y | Y |

AND

Subscriber Feature = | N | N | N | N | N | N | N | N | N | Y | N | N | N | N | N | N |

XOR

CFIMB Mutually Inc Tble Entry = | Y | Y | Y | Y | Y | Y | Y | N | Y | Y | N | Y | Y | Y | Y | Y |

RESULT = | N | N | N | N | N | N | N | Y | N | N | N | N | N | N | N | N |

FLEXIBLE SOFTWARE ARCHITECTURE FOR A CALL PROCESSING SYSTEM

CROSS-REFERENCE TO RELATED APPLICATIONS

This is a continuation of Ser. No. 07/906,957 filed Jun. 30, 1992.

This is a continuation of Ser. No. 08/184,740 filed Jan. 21, 1994.

This is a continuation of Ser. No. 08/335,924 filed Nov. 8, 1994.

This is a continuation of Ser. No. 08/538,167 filed Aug. 23, 1995.

This is a continuation of Ser. No. 08/656,995 filed May 24, 1996.

A related application entitled, "A Call Processing System", patent application Ser. No. 09/906,957 filed Jun. 30, 1992, has been filed by the same inventor concurrently with this application.

TECHNICAL FIELD

This invention relates to a call processing system for a telecommunications network. More particularly, this invention relates to a call processing system that utilizes a generic methodology to resolve feature interactions between the basic call software and the feature software that realize the call processing operation.

BACKGROUND OF THE INVENTION

Modern telecommunications networks use a layered network architecture that separates the physical elements or hardware (also called "resources") and the software that perform a particular network operation. The network operation of call processing, i.e., the connecting of subscribers, comprises basic call software (which governs the functions to connect subscribers together) and call feature software (which governs the operation of feature services). Examples of feature services include call waiting (CW), call forwarding (CF), attendant emergency override (AEO), do not disturb (DND), three-way calling (TWC), etc.

Since the introduction of computer-based switching systems, the number of feature services provided to subscribers has grown dramatically. This has driven network software design to promote feature-related considerations of the call processing operation. Such considerations include fast developmental responses to new switch-based feature requests by subscribers, more varied and specialized features for subscribers, and development of feature software in various network company locations. Modern call software models, for example, of the networks of the recently introduced Intelligent Network ("IN") type, handle these feature-related considerations by separating basic call software and call feature software. This separation provides basic call stability while allowing fast feature introductions.

However, the growth of subscriber feature services has caused an even larger growth in the number of interactions between the basic call software and the call feature software (known as "feature interactions") to implement features during a call. In existing switching systems, these feature interactions are usually implemented by embedding special feature interaction checks throughout the basic call software. This permits interactions to be resolved despite a constantly growing feature set since all features are located in the same switching system. But, as a consequence of using such hard-coded software (which is customer-specific) with the basic call software, the entire switching system software rather than specific software is required to be upgraded with each new feature that is introduced. Moreover, feature interactions cannot be resolved in this manner in an IN-type network. In such a network, a feature may physically reside in a geographically remote location from the subscriber and the switching system and, thus, each newly introduced IN feature requires new switch software.

The growth of subscriber features has caused a similar problem in the network operation of administration that comprises administration software (which defines system and subscriber line characteristics) and call feature software (which defines the characteristics of call features). In particular, there is now a large number of interactions between the administration software and the call feature software to assign or modify features for respective subscriber lines. As with the call processing operation, these feature interactions are currently implemented by the use of hard-coded software with the administration software and, consequently, have limitations similar to those described above.

Consequently, there is a need for a call processing system that is more flexible in resolving feature interactions, both for the call processing operation and the administration operation.

SUMMARY OF THE INVENTION

Briefly, the invention provides a method having the steps of a) executing, at a predefined time during the execution of the operating program, an operation using the data stored in the memory of the call processing system to activate a respective subroutine program, said activation operation being independent of the type of subroutine program to be activated, b) accessing the data stored in the memory for the activation operation of the executing step, said data being arranged in the memory in logical table and bit map format so as to enable the interaction of the respective subroutine program with the operating program to be customized, and c) executing the respective subroutine program upon the activation of said program. The method may also have an additional step of repeating steps a, b, and c for each of a plurality of subroutine programs available to be activated at the predefined time in an order determined by the data regarding the subroutine programs.

The step of executing the activation operation may include data operations with the entries of the data tables and data bit maps, such as, performing bit map logical operations and bit map searching operations with the entries of the data tables and data bit maps. In addition, the step of executing the respective subroutine program may include executing a task by the operating program other than executing the respective subroutine program.

Further, the step of executing the activation operation may include resolving the order of activation of a plurality of subroutine programs at the predefined time, said data defining interactions and priorities of activation among the subroutine programs, while the step of executing the respective subroutine program includes executing each respective subroutine program in the order of activation.

Advantageously, the invention implements a more flexible method to support feature interactions, which in existing systems have an impact on basic call software and require software upgrades with each new feature addition or modification, by the use of administrable data tables (which includes bit maps) and a table-driving algorithm. The table format, which accommodates feature data and subscriber-specific checks, permits such data to be customized as desired and to be checked easily, manually or automatically, guaranteeing feature interaction completeness. Also, by table-driving feature interactions, clear separations between basic call software and call feature software can be supported, so that new feature additions and changes only require administrative inputs rather than software upgrades. Further, the algorithm is feature-independent so that generic software code can be developed for the basic call software. Consequently, basic call software can be developed to control basic call activity and to perform generic table-driving algorithms common to all subscribers while feature software can be developed independently to meet individual subscriber needs.

Advantageously, the invention also provides a set of precise rules that more uniformly defines feature interactions than currently accomplished via the use of interaction specification documents. In addition, the invention centralizes the feature interactions in one location. Further, the invention is IN compatible and provides a base which is useable for current and future IN standards.

The invention may also aid in the managing of networks that are often now composed of elements from different vendors by implementing a call processing design that is functionally split sufficiently to support feature "pluggability" and to localize the impact of the features to the software. Further, the invention implements a call processing design that has "building block" capabilities which can be controlled from network equipment at subscribers' premises to allow customized feature development off the network switch and to permit the amount of shared software to be maximized while allowing for localized variants.

BRIEF DESCRIPTION OF THE DRAWINGS

For a better understanding of the invention, reference is made to the following description of an exemplary embodiment thereof, and to the accompanying drawings, wherein:

FIG. 2b is a block diagram, in more detail than FIG. 2a, of the structure of call processing software operated by a processor of the system of FIG. 1;

FIG. 3a is a block diagram of a segment chain for a basic call requiring no feature software;

FIG. 3b is a block diagram of a segment chain for a call that provides one feature;

FIG. 5 shows the basic layout of a first administrable table, used by feature interaction software of the processor, for blocking and overriding feature interactions;

FIG. 6 shows the basic layout of a second administrable table, used by feature interaction software of the processor, representing trigger points;

FIG. 7 shows the basic layout of a bit map used by feature interaction software of the processor;

FIGS. 10a through 10g log show an example of the feature interaction algorithm of FIG. 9 for interactions between the features of call forward inhibit make busy (CFIMB), make busy key (MBK) and call forward variable (CFV).

DETAILED DESCRIPTION

Figure 1:
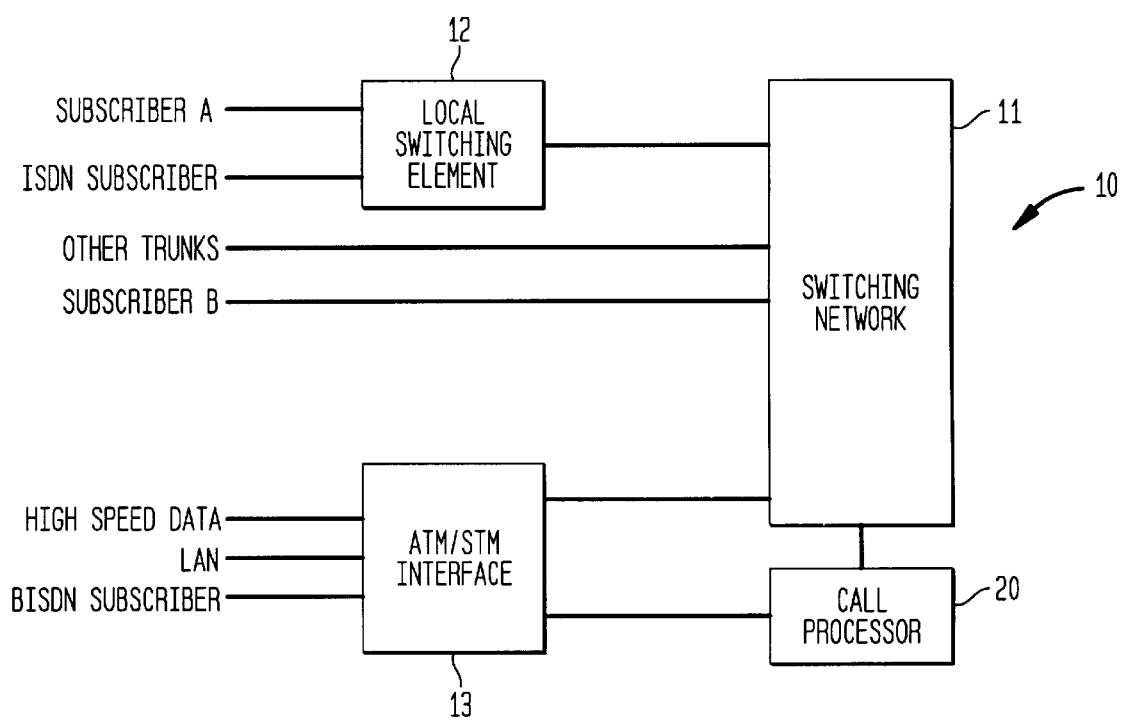
FIG. 1 is a block diagram of a call processing system of the present invention and a call path established thereby between two subscribers A, B.

FIG. 1 is a block diagram of a call processing system 10 of the present invention and a call path established thereby between a first subscriber A and a second subscriber B. A switching network 11 has various types of subscribers connected thereto, examples of which are shown in the figure and include subscriber A (using, for example, a local switching element 12) and subscriber B. Note that the subscribers A, B can each be one of the various subscriber types, including a subscriber in an asynchronous transfer mode environment who is connected to the network using an asynchronous transfer mode/synchronous transfer mode (ATM/STM) interface 13. Note also that the subscribers A, B can be connected to two different switching networks 11 (either of the same type or of different types, e.g., a central-control TDM system, a distributed-control TDM system, a packet switching system, etc.) which are connected to one another by trunk lines therebetween (and, thus also, the two subscribers A, B). The switching network 11 also has a call processor 20 connected thereto that operates the call processing software and, thus, controls the call processing operation, including the associated hardware elements, for the system 10. The call processor 20 may be configured, alternatively, to be an integrated element of the switching network 11.

The call processing system 10 follows a layered network architecture separating hardware elements from software. Such an architecture also partitions the software for each operation into different functional layers, conforming to the configuration of a system software model. A basic software model has a resource software layer (lowest level) which interacts with the system's physical elements; an applications software layer (highest level) which realizes the capabilities, or features, of the network 11 and of the subscribers; and a server software layer (middle level) which logically drives the many system operations and enables the applications software to make use of the resources without specific knowledge of how the operations are to be accomplished. Variations of the basic model, for example, that further partition the layers or establish sub-models within each layer, often are implemented in order to facilitate the workings of modern telecommunications networks which are mostly distributed systems.

The system 10 implements a layered model for the call processing software which separates the higher logic-related levels from the lower hardware-related levels and basic call software from call feature software at the applications level. As noted above, such a layered software structure supports switch enhancements (such as, location-specific variants, different hardware technologies, new hardware capabilities, and customer-specific customization) while minimizing structural impacts to the system 10. Also, as noted above, the processor 20 operates the call processing software for the system 10. The processor 20 may be configured, in the alternative, to operate only the higher logic-related levels; subscriber-based elements would then handle the lower hardware-related levels. In the case of the two subscribers A, B being connected to interconnecting networks 11, the system 10 may also be configured to have the processor 20 share such control and responsibility with the existing switch processors; this enables the hardware elements to be controlled only by their own host software and the processor 20 to control only certain switching components.

Figure 2A:
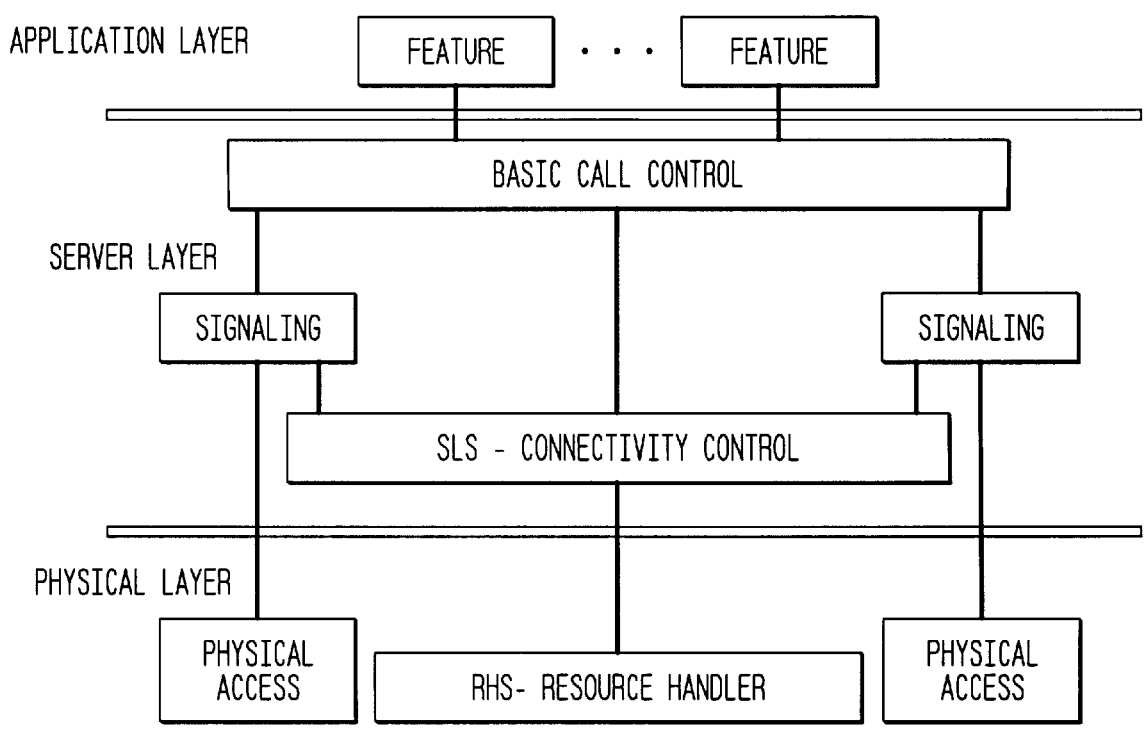
FIG. 2a is a block diagram of the structure of call processing software operated by a processor of the system of FIG. 1.

FIGS. 2a and 2b show simplified and detailed block diagrams, respectively, of the structure of call processing software operated by the processor 20. The basic call software comprises a number of functionally separate subsystems which each handles a specific call processing activity. The subsystems include a connectivity control (SLS) that performs logical and physical switching, shielding higher application layers from lower resource layers so that system software and hardware can be changed without impact to one another and a resource handler (RHS) that manages the resources of the system 10, e.g., protocol handler, code receiver, tone generator, channel switcher, etc. The subsystems also include a signalling system (ESIS) that handles the interworking of the different signalling schemes of the two subscribers A, B, a billing system (BILLS) that formats and stores a billing record from information received from other subsystems, and a statistics system (STATS) that processes and stores statistical information received from other subsystems. In addition, a logical call control system (ECPS) provides generic call control capability, including call routing, basic call set-up/cleardown, feature interaction control, feature processing, and call events reporting to the BILLS and STATS systems. The ECPS system initiates, but does not handle, the physical call set-up/cleardown which is instead processed by other subsystems. Note that the call feature software is separated from the basic call software at the applications layer.

Each subsystem comprises one or more state/event machines formed by static units (known as "managers") and state transition units (known as "segments"). The managers provide a neutral interface between the software and a database established for the system 10 and, thereby, provide data to the segments. Note that the database may be configured to be an integrated element of the basic call software (as shown in FIG. 2b) or a separate software entity that interacts with the basic call software. Also note that the database may be configured as a number of separate databases (as shown in FIG. 2b) or as a single database. The segments perform logical call control functions, for example, processing seizure/release activities and performing feature-specific actions. A call model for connecting subscribers consists of chaining together various state/event machines to form a customized segment chain, or call chain, handling a single call. The segments are added or removed from a call chain on call-specific requirements and subscriber/network features.

The ECPS system uses several types of managers and segments. An access manager (AM) represents physical access to the system 10 (i.e., a trunk or a line) and is independent of signalling type. The AM handles the access database read/write requests and performs access-related busy/idle handling. A user manager (UM) represents a user identity, such a directory number (DN). The UM handles the DN database read/write requests and performs user identity-related busy/idle handling. A network routing manager (NRM) evaluates digit information via translators and determines the appropriate call treatment. The NRM handles the translation database read/write requests and may control several translators which can be customized for a subscriber. Note that the connections between the segments and the respective databases are shown in FIG. 2b rather than the actual managers.

Figure 2C:
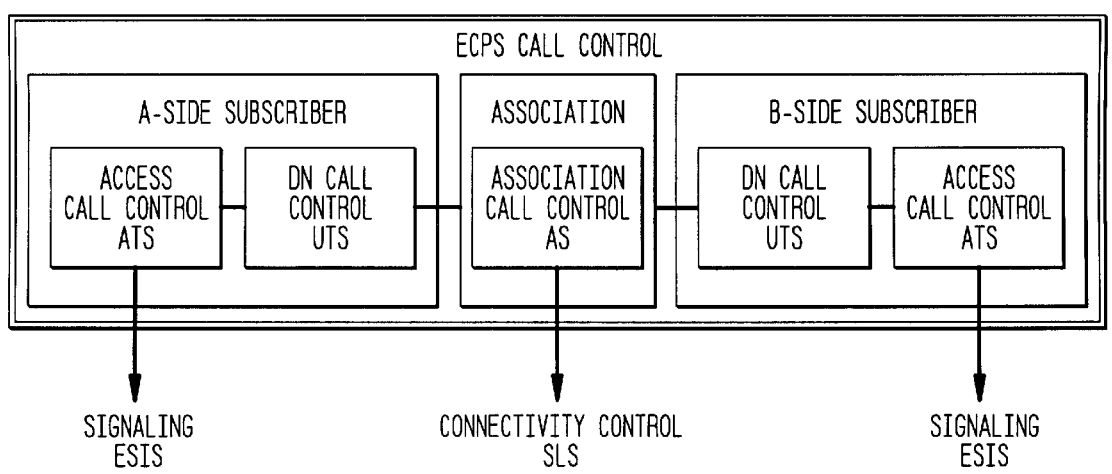
FIG. 2c shows a block diagram of the call control system of the basic call software operated by a processor of the system of FIG. 1.

FIG. 2c is a block diagram of the segments of the ECPS system (Note that FIG. 2b shows additional details with regard to the segment connections—the connections with the BILLS and STATS subsystems and the call feature software are shown as open nodes). An access transaction segment (ATS) represents a single request for access resources (i.e., line/trunk capabilities) which include, for example, a single trunk, a single subscriber B-channel, or an assigned bandwidth. The ATS also controls access feature triggering. A user transaction segment (UTS) represents a single request for user resources (e.g., a DN or a mobile user). Each subscriber A, B of a call has an associated ATS and UTS (and related managers AM, UM). An associator segment (AS) associates an subscriber A-side/subscriber B-side pair of a call and coordinates call set-up/cleardown. Either the ATS, UTS or AS can control user feature triggering. Although not shown in this figure, a feature segment (FS) represents an individual feature from feature software at the application level and is linked to a call chain when requested by a subscriber A, B or the switching network 11. Each FS contains feature-specific logic and has access to its specific feature-related data so that feature-specific logic is centralized in one software unit.

FIG. 3a shows a block diagram of a call chain for a basic call, requiring no feature software, between subscriber A and subscriber B. The segments are ordered along the call chain such that signals sent from one call end to the other pass through segments in priority order. This allows higher priority segments a chance to intercept signals and/or act on them before lower priority segments. A basic call is initiated by a subscriber A who picks up a telephone terminal to call subscriber B. A subscriber line module SLM (not shown) at the subscriber A-side detects a seizure line signal from the terminal pick-up and sends a signalling-specific seizure message to the call processor 20. The subscriber A-side ESIS of the basic call software converts the message into a generic seizure message, invokes an ECPS ATS, and passes the message to the ATS. The ATS then requests access-related data from the AM (Note that the managers and databases are not shown in the figure). The AM reads the data from the subscriber A-side database, performs access-related busy/idle handling and returns access seizure data to the ATS. The ATS stores the access data, invokes a UTS and passes the seizure message to the UTS. The UTS then requests DN-related data from the UM. The UM reads the data from the subscriber A-side database, performs DN busy/idle handling, and returns DN data to the UTS. The UTS invokes an AS which requests digits via a message sent through the call chain to the subscriber A-side ESIS. At this time, the call chain consists of subscriber A-side ESIS-ATS-UTS-AS.

Based on the signalling type, the ESIS determines dial tone and whether a code receiver (not shown) is needed and informs the SLS accordingly. The SLS determines optimal resource location and requests resource allocation and connection from the related RHS. The RHS notifies the particular hardware element of the switching network 11 and controls the hardware connection. The code receiver sends the digits upon receipt directly to the ESIS. In response, the ESIS requests disconnection of dial tone from the SLS, converts the digits to the standard interface and sends the digits through the call chain to the AS. Note that both the digit request message and the digits pass transparently through the ATS and the UTS. The AS then sends the digits to the NRM, which passes the digits through translators (not shown) and the translation database. Once a translation result is determined, the NRM returns the result to the AS, which invokes a subscriber B-side UTS.

Once the end of dialling has been detected, the subscriber A-side ESIS releases the code receiver via command to the SLS which, in turn, notifies the RHS to disconnect and idle the physical resource. The subscriber B-side UTS requests and checks DN data from the UM (and the subscriber B-side database) and then invokes an ATS. The ATS requests data from the AM (and the subscriber B-side database) and busies the access busy/idle status. The ATS then invokes an ESIS which reports the seizure to the subscriber B-side SLM and provides required data. The SLM then applies ringing current to the telephone terminal of subscriber B. The ESIS requests connection of ring-back tone from the SLS, which in turn notifies the RHS, which allocates a tone source. The SLS now switches the tone source through to the subscriber A-side. The SLS determines switching network 11 requirements and requests switching resources (e.g. channels) from the RHS. Once switching resources are assigned and locally set-up, the SLS sends necessary commands to complete the switch connection.

Once answer occurs, it is detected by the subscriber B-side SLM which then disconnects power ringing and sends a connect message to the ESIS. The ESIS requests ring-back tone disconnection and then converts the connect message to a generic message and passes it through the call chain to the ATS. The ATS notes that answer has occurred and forwards the message to the subscriber A-side. Speech can now proceed between the two subscribers A, B.

FIG. 3b shows a block diagram of a call chain for a call requiring one feature between subscriber A and subscriber B. The structure and operation of the feature call chain is similar to the basic call chain described above with an addition of the introduction and handling of a feature segment FS. A feature call chain, requiring specific feature logic, has a respective FS from call feature software linked to the basic call segments. Multiple features within a call chain can also be implemented. The linking of an FS to the basic call chain is accomplished by a feature interaction between the basic call software and the subscriber-specific call feature software.

In present call processing systems, feature interaction is accomplished by the use of feature check software embedded throughout the basic call software to determine whether features are active or not. These feature checks are performed at well-defined points, known as trigger points, within a basic call chain. Trigger points include, for example, call origination (i.e., a calling subscriber A picks up a terminal and thus goes off-hook), authorizing origination attempt (i.e., off-hook validation checks), digit analysis/translation, answer (i.e., a called subscriber B answers incoming call), call to a busy subscriber B, and mid-call triggers (i.e., a calling subscriber A hook-flashes or time-out occurs). Any number of trigger points may be used and defined in a system; for example, U.S. AIN Release 0.1 (Advanced Intelligent Network standard) defines approximately 30 such trigger points in a basic call chain. As shown in the figure, during a feature call operation, a feature check reveals an active feature at a trigger point. In response, call feature software interacts with the basic call software, and other features, and the FS is linked to the basic call chain. The call chain will then be able to execute feature logic. In contrast, during a basic line to line call between two subscribers A, B, only basic call software is required. Therefore, a feature check will reveal no active features at a trigger point and the basic call chain will not execute feature logic.

Note that a feature check momentarily halts call processing at each trigger point. Further, present call processing systems perform feature checks throughout a call chain whether or not any features are to be triggered during a call.

In the call processing system of the present invention, the processor 20 utilizes a novel feature interaction algorithm within the basic call software to resolve the triggering of a FS and the interaction with the basic call chain. The algorithm is executed at each trigger point and operates on feature data arranged in table and bit map formats stored in the database for the system 10. Upon resolution of the triggering of a feature, the algorithm then directs the interaction of the call feature software with the basic call software. The table and bit map format enables the call features, and supporting data, to be identified and recognized in a neutral fashion, such as by the use of index numbers or other neutral identifiers for the rows and columns (as shown in the drawings). Consequently, the feature interaction algorithm is feature independent (unlike current embedded feature check software) so that generic code, supporting the basic call software and useable whenever called upon by the software, can be utilized by the processor 20 to realize the algorithm. In addition, the data tables and bit maps are both "administrable", i.e., can be customized, and thus enable feature interactions also to be administrable. As a result, new trigger points can be defined in the call chain simply by adding additional feature interaction algorithm calls to the basic call software and adding the necessary data to the data tables and bit maps. Similarly, changes to existing trigger points can be made by changes to the respective portions of the basic call software and the data of the data tables and bit maps. Thus, both modifications to existing features and introductions of new features can be made without altering the entire call processing software and call processing software can be developed independent of feature interactions. Note that the term "table" is used herein in a logical sense and not in an implementation sense.

Figure 4:
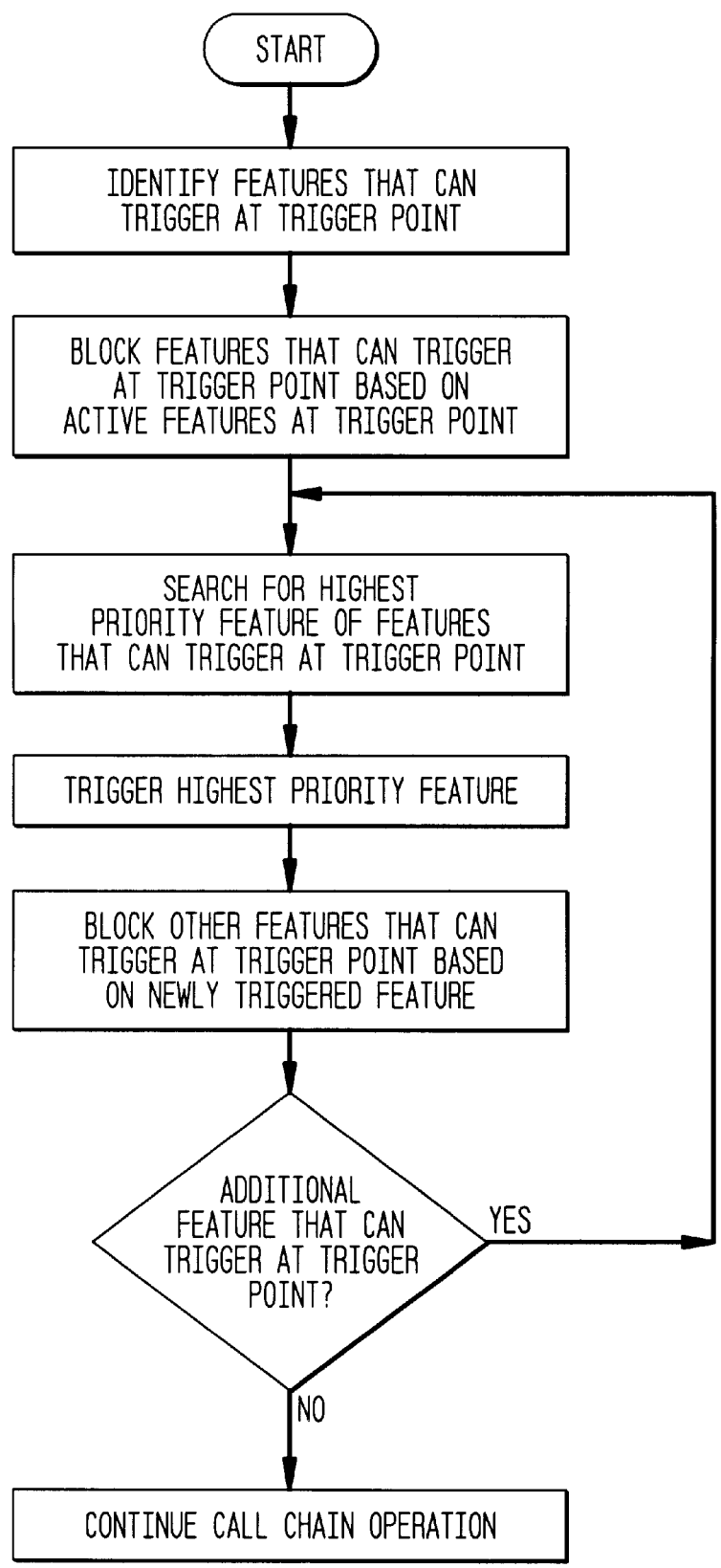
FIG. 4 shows a flowchart of a feature interaction algorithm used by feature interaction software of the processor.

FIG. 4 shows a flowchart of the feature interaction algorithm. The algorithm comprises the steps of a) determining which features can trigger at a respective trigger point based on the administrable data tables and bit maps; b) blocking features that can trigger at a respective trigger point based on the features which are currently active; and c) continue executing the algorithm while there are features to trigger (i.e., continue executing the algorithm for all additional features at a respective trigger point), triggering the highest priority feature, and then blocking features that can further trigger at the respective trigger point based on any newly triggered feature. The first step determines candidate features requesting triggering at a specific trigger point. Candidate features include features provided by the switching network 11 and stored in a trigger point table; features subscribed by the subscriber and stored in a subscriber bit map; and features provided by the switching network 11 and stored in a persistent features table. Candidate features may also include features requested by a subscriber via access code (e.g., call forwarding activation). The second step permits a feature to trigger only if it is not blocked by a currently active feature. The first and second steps trigger allowable features in a priority order that is established at the most recent formatting of the system 10. Each newly triggered feature may block other features so its own blocking characteristics are taken into account before further feature triggering occurs in the third step. The third step allows multiple features to trigger at a single trigger point.

The data tables represent feature interaction categories and trigger points. The call processing system 10 uses a small set of feature categories to define all of the types of call processing feature interactions. For example, a first category may comprise blocking interactions wherein an active feature blocks another feature from activating, for example, during a 911 call, a call waiting service feature is either inhibited (i.e., no call waiting tone is generated) or its flashes are not recognized. A second category may comprise overriding interactions wherein a first feature, when activating, overrides a second feature from activating, for example, an attendant camp-on overrides call waiting terminating variants. A third category of feature interactions may comprise interactions that require special feature software wherein feature-specific software or an IN Service Logic Program (SLP) is required to handle the interaction. An example of this category is the indication at the attendant console display that an attendant barge-in is refused when a multi-party call is active. Note that the first two interaction categories are to be implemented by the feature interaction algorithm, and thus require table representations, since each has an impact on basic call processing. In contrast, the third interaction category does not have an impact on basic call processing, since it defines logic which is best located in the customer-specific feature software or in an IN SLP and, thus, is not implemented by the algorithm and does not require table representation.

FIG. 5 shows the basic layout of a first administrable data table for each of the blocking and overriding interactions categories. As shown in the figure, both the horizontal axis (or columns) and the vertical axis (or rows) of the table represent features ordered by priority. Priority of the features available in the system 10 is normally established during the most recent formatting of the system 10 parameters but may be changed at any time. Feature priority is obtained by determining which feature would take priority if a first feature and a second feature both triggered together. In many cases, features do not interact so that feature order is not significant (e.g. three-way calling and speed calling). In a blocking interaction table, table entries are populated by determining whether a vertical feature is blocked when a respective horizontal feature is currently active. In an overriding interaction table, table entries are populated by determining whether a vertical feature is blocked when a respective horizontal feature is newly activated.

FIG. 6 shows the basic layout of a second administrable data table representing trigger points. The trigger point table defines, per trigger point, features requiring checks and actions to take when a specific feature triggers. The vertical axis of the table represents an internal trigger point identity (e.g., trigger point 1=OFF HOOK event, trigger point 2=HOOK FLASH event, etc.) while the horizontal axis represents a feature. Features are ordered by priority as described above. Table entries are populated by determining whether a feature requires a check at the trigger point and the action required by the feature if triggered. Note that all table entries (and bit map entries described later) may be changed at any time although they are normally established during the most recent formatting of the system 10 parameters.

Once a feature is triggered, the action required by the table is directed by the feature interaction algorithm. Examples of such actions include a) EXECUTE FEATURE SOFTWARE: Specified feature software is executed, b) APPLY ACTIVE FEATURE BLOCKING TABLE ENTRY: The triggered feature applies its blocking attributes to a master bit map, blocking selective features from triggering at the trigger point, c) SEND SIGNAL TO FEATURE OBJECT: The current signal (e.g. hook-flash) is sent to previously-invoked feature software, d) MODIFY SUB-SCRIBER TRIGGER POINT: This allows a feature to modify a later trigger point, thereby activating or deactivating a feature; this may occur when subscriber A-side features trigger and modify subscriber B-side trigger points (e.g. dial call waiting wherein the calling subscriber A temporarily adds call waiting to the called subscriber B trigger points), e) SEND A MESSAGE TO ANOTHER OBJECT: A predefined message is sent to another object, e.g., a DTMF violation requires a message be sent to billing and/or maintenance indicating the violation, and f) OUTPUT DATA: A message is sent to a display screen. Further actions may be defined and added or existing actions may be modified at any time. Note that, in many cases, actions do not result in feature software invocation and interaction but rather generic actions performed by the basic call software. Also note that some actions enhance basic call software since some features may be realized simply via the action without the need for call feature software.

The data bit maps represent subscriber/network capabilities. FIG. 7 shows the basic layout of an administrable data bit map used by the feature interaction algorithm. A data bit map is 1×N dimensioned, N representing the number of features in priority order (established as described above), similar to one row of the data tables described above. A data bit map is a transient bit map that maintains current feature status for a specific call. A data bit map is generally initialized at the beginning of a call and updated as feature status changes. A first data bit map, a subscriber feature bit map, represents features the subscriber has assigned to the subscriber's own line. The subscriber feature bit map is populated at the beginning of the call based on fixed subscriber data and does not change once read from the respective subscriber database. A second data bit map, a persistent feature bit map, represents long-lived features that, when triggered, activates other related trigger points. Generally, persistent features are requested by the calling subscriber A and, once requested, triggers on the called subscriber B-side of the call chain when the call terminates, for example, call waiting (CW), attendant emergency override (AEO), etc. The second trigger point is termed a persistent feature trigger. Note that the persistent feature bit map is initialized and used only when related features are accessed.

The feature interaction algorithm performs two types of data operations on the entries of the data tables and the data bit maps to implement the algorithm steps. First, the algorithm performs bit map logical operations, including AND, OR, and XOR (i.e., exclusive OR) operations, which are possible between table rows and bit maps because the tables and bit maps have one common dimension reflecting priority-ordered features. The result of bit map logical operations are new bit maps, each "SET" bit (designated in the figures by a "Y" symbol) representing a feature passing the operation condition(s). Following a logical operation, the remaining "SET" bits are identified and related features triggered. To accomplish this, the algorithm performs bit map search operations to search bit maps for "SET" bits and identify their relative bit position. Since features are priority ordered, algorithm searching from the most significant bit to the least significant bit results in priority ordered feature identification.

FIGS. 8a through i show, as an example of the operation of the feature interaction algorithm, the data tables, data bit maps, and logical operations used by the algorithm for an interaction between the features of attendant emergency override (AEO), do not disturb (DND), call forwarding (CF), and call waiting (CW). The AEO feature provides an attendant the ability to complete a call to a called subscriber B who is currently busy with a call and override subscriber features which would normally effect call termination. The AEO feature is a persistent feature which first triggers on the calling subscriber A-side of the call chain when the attendant dials the AEO access code and later triggers on call termination on the subscriber B-side at which time it overrides certain subscribed features. The figures illustrate the algorithm operation with respect to the second trigger condition only.

Figure 8A:
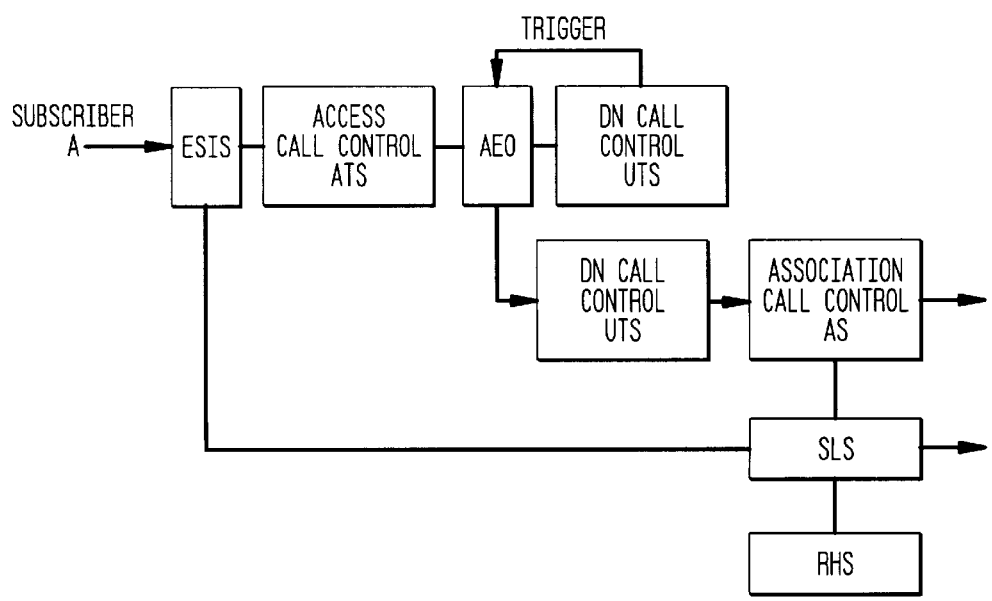
FIGS. 8a through 8b show an example of the feature interaction algorithm of FIG. 4 for interactions between the features of attendant emergency override (AEO), do not disturb (DND), call forwarding (CF), and call waiting (CW)

The initial condition in the example is a subscriber B who is busy with a call and who subscribes to DND, CF, and CW. Also, AEO is formatted to have a persistent trigger condition at the "SUBSCRIBER BUSY" trigger point on the subscriber B-side of the call chain. In operation, an operator dials the number of the subscriber B and the AEO access code. FIG. 8a shows the subscriber A-side (i.e., the attendant) of the call chain which is similar to a basic call chain with the addition of the first trigger condition caused by the dialing of the AEO access code. The AEO access code is carried to the basic call software as a message defining the feature and requesting a specific trigger point. The feature interaction algorithm of the basic call software executes at the specified trigger point and operates on the feature interaction data (not shown in the figures) to resolve the triggering. Upon resolution, the algorithm directs the linking of the AEO feature segment to the call chain. Note that the operation of the segments and the managers of the call chain are not affected by the feature trigger.

Figure 8B:
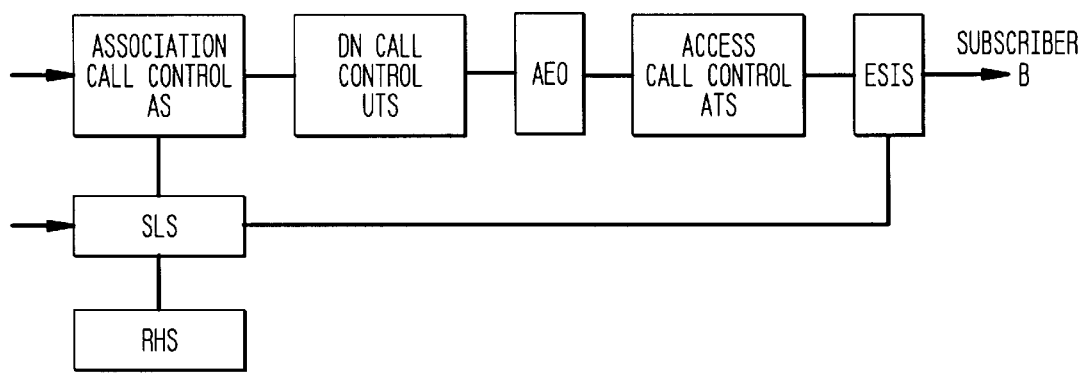

FIG. 8b shows the subscriber B-side of the call chain and the persistent trigger condition at the "SUBSCRIBER BUSY" trigger point. The call chain is similar to a basic call chain with the addition of the persistent trigger condition (i.e., the AEO FS) caused by the initial trigger resolution by the algorithm. At this trigger point, the basic call software again utilizes the feature interaction algorithm to handle the AEO feature triggering and interaction.

FIG. 8c shows the logical operations performed by the algorithm during the first step that determines which features can trigger at this point based on the trigger point table, the subscriber bit map, and the persistent feature bit map. Initially, the algorithm looks up the respective row entries of the trigger point table for the SUBSCRIBER BUSY trigger point (shown in FIG. 8i) and the subscriber bit map for the called subscriber B (shown in FIG. 8g). Note that the SET bits of the table and the bit map (designated as "Y") indicate that the corresponding feature is available. Next, the algorithm performs an AND operation on the two data sets. The intermediate bit map result, although not shown, is NYYY. This represents the features common to both the features provided by the network 11 and the features subscribed to by the calling subscriber B. Note that FIG. 8f shows the feature priority that is established within the call processor 20 in this example and utilized by the data tables and data bit maps. The algorithm then looks up the persistent feature bit map for the AEO feature and performs an OR operation with the intermediate bit map result. The resulting bit map after the logical operations of the first step represents the features that can trigger at the SUBSCRIBER BUSY trigger point. In this example, the SET bits of the resulting bit map indicate that each feature (i.e., AEO, DND, CF, CW) can trigger. Note that DND, CW, and CF can be triggered by the called subscriber B. for example, by a hook-flash of the terminal. Also note that most calls do not require all data bit maps to be checked to determine candidate features; only required checks are made based on whether persistent features are active or on which trigger point is being used.

FIG. 8d shows the logical operations performed by the algorithm during the second step that blocks features that can trigger, e.g., the AEO feature, based on the currently active features. The algorithm looks up the triggered feature blocking table (shown in FIG. 8h) and, for each active feature, performs an AND operation between the resulting bit map of the first step and the row of the blocking table for the active feature. In this example, the algorithm does not perform the operation since there are no currently active features on the line of the called subscriber B as per the initial condition. The resulting bit map of the first step therefore does not change. Note, however, that the triggered feature blocking table shows that the AEO feature would not be blocked in any case by any of the features that could be currently active, i.e., DND, CW, CF (for example, if CF was active then an AND operation between the resulting bit map YYYY from the first step and the CF row YYNN of the blocking table would yield a resulting bit map YYNN, indicating that AEO is not blocked). The resulting bit map after the logical operations of the second step represents the features that can trigger at the SUBSCRIBER BUSY trigger point and that are not blocked.

FIG. 8e shows the logical operations performed by the algorithm during the third step to continue executing at the trigger point for any additional features to be triggered. The algorithm first conducts a bit map search to determine the most significant SET bit of the resulting bit map from the second step. In this example, the first bit, i.e., AEO, is the most significant SET bit. Note that a search resulting in a null set, i.e., no SET bits, indicates there are no further features to trigger at this trigger point. The algorithm then proceeds to trigger the highest priority feature, i.e., the AEO feature represented by the most significant SET bit. To accomplish this, the algorithm first looks up the trigger point table row entry for the AEO feature (shown in FIG. 8i) and then performs the required feature initiation action. In this example, the initiation action for AEO is action 1 which signifies that the algorithm is to trigger AEO feature software, which controls termination to the called subscriber B. Note that the initiation action is established during the most recent formatting at the system 10 and, as noted above, may not result in a feature invocation.

The algorithm then proceeds to block features that can further trigger (i.e., DND, CF, CW) based on the newly triggered feature (i.e., AEO). The algorithm looks up the triggered feature (i.e., AEO) row entry from the triggered feature blocking table (shown in FIG. 8h) and performs an AND operation with the resulting bit map from the second step. The new resulting bit map represents features that can still trigger at the trigger point. In this example, the new resulting bit map has no SET bits. Therefore, the AEO feature has blocked all other features from triggering and no further feature triggers are required. In the event that the new resulting bit map had SET bits, then the algorithm would proceed to repeat the third step to trigger further features in priority order until no features remained to be triggered (i.e., no SET bits in the resulting bit map).

Upon resolution of all the feature triggering, the algorithm directs the linking of the AEO FS (and, in the case of multiple feature triggering, all of the FS's of the features that can trigger at this trigger point) to the call chain. Thereupon, the call chain continues its operation until the next trigger point (in which case the algorithm executes again) or call termination.

The feature interaction algorithm and data tables and bit maps provide an administrable method for the processor 20 to manage feature interactions in a call chain without having an impact on basic call software. IN-type networks have similar goals but have the further requirement that features may be located off the switch on service control points (SCP). Interactions between switch-based features and SCP-based features can also be addressed with the use of the feature interaction algorithm described above.

To accomplish this, the SCP, as a whole, is added to the feature priority list of the system 10 with individual SCP features remaining unknown. The SCP can be added in one or more places depending upon how its features interact with switch-based features. The SCP itself resolves interactions between two SCP features. Related SCP data is then added to each of the feature interaction tables indicating related trigger points and feature blocking requirements. This is an administration step which does not require new switch-based software. Included in the related SCP data is a new action (added to the trigger point table) which directs a message to be sent to the SCP at a trigger point, for example, requesting the SCP feature to be executed. Consequently, with the use of the feature interaction algorithm, switch-based and SCP features may interact flexibly without forcing one feature set higher priority than the other.

The network operation of administration (i.e., defining system and subscriber line characteristics) is similar to call processing in that administration software also interacts with feature software at well defined points. Generally, only one trigger point is required and that occurs when subscriber line characteristics are changed or added. At the trigger point, data must be checked to verify that the feature to be assigned and all assigned subscriber features are allowed together.

Similar to the call processing system, the administration system may utilize a feature interaction algorithm within the administration software to resolve the triggering of a feature to be assigned and the interaction with the software. The algorithm is executed at the trigger point and operates on feature interaction data arranged in table and bit map formats stored in the database for the system. Upon resolution of the triggering of a feature, the algorithm then directs the interaction of the feature software with the administration software.

Figure 9:
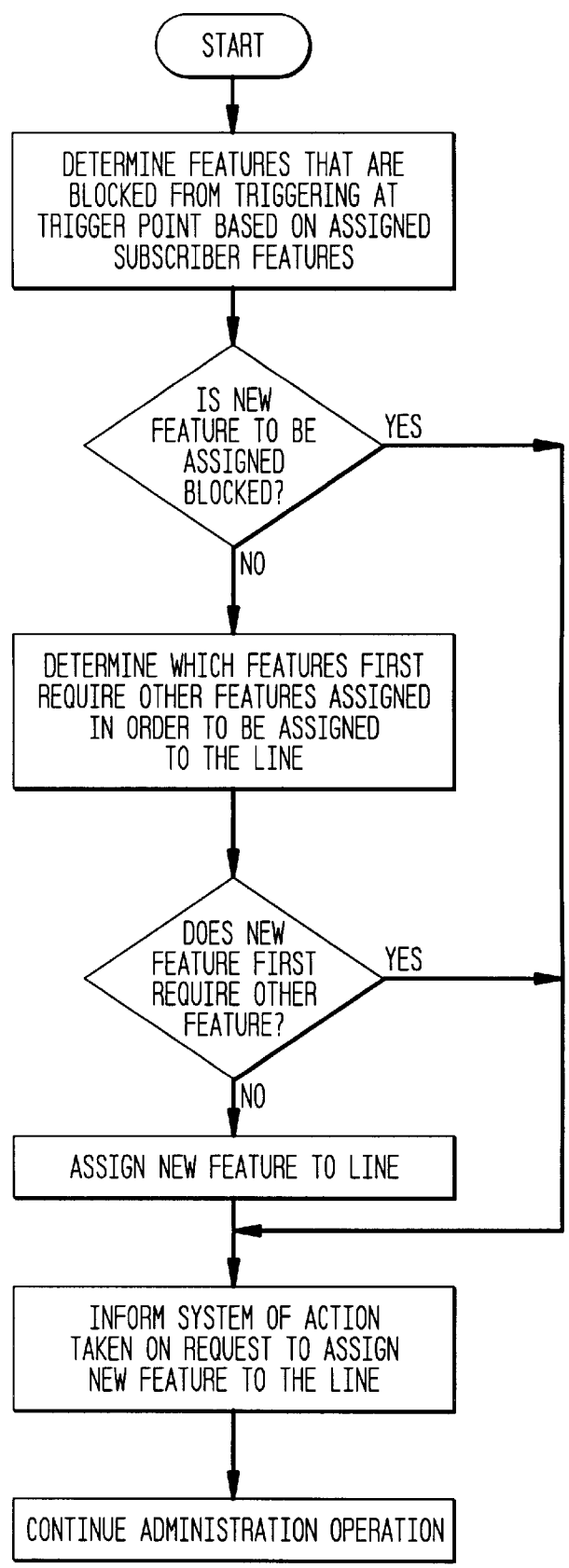
FIG. 9 shows a flowchart of a feature interaction algorithm used by administration software of the system.

FIG. 9 shows a flowchart of a feature interaction algorithm used by administration software of the system 10. The algorithm comprises the steps of (a) determining blocked features based on assigned subscriber features; (b) checking if the new feature to be assigned is blocked (and if yes, rejecting the request to assign); (c) determining which features first require other features assigned to the line; and (d) checking if the new feature to be assigned is blocked (and if yes, rejecting the request to assign). The first and second steps determine which features are blocked due to features already assigned to a line. For example, these steps would block a request such as assigning call waiting to a line already assigned 911. The third and fourth steps determine which features first require other features assigned to the line. For example, these steps would block a request such as assigning Call Forward Inhibit Make Busy before the Make Busy feature is assigned to the line.

The administration feature interaction algorithm uses data tables, data bit maps, and data operations which are similar to those used by the call processing algorithm described above and uses them in a similar manner. For example, the administration feature interaction algorithm uses two administrable tables, an administration blocked table and an administration mutually inclusive table. The basic layout of the tables is shown in FIG. 5 (described previously), wherein both the horizontal axis (or columns) and the vertical axis (or rows) of a table represent features ordered by priority. As with the call processing interactions, priority of the features available in the system 10 is normally established during the most recent formatting of the system 10 parameters but may be changed at any time. In addition, feature priority is obtained by determining which feature would take priority if a first feature and a second feature both triggered together. In many cases, features do not interact so that feature order is not significant.

In an administration blocked table (for assigned features), table entries are populated by determining whether a vertical feature is blocked from being assigned to a subscriber line when a respective horizontal feature is already assigned to the line. In an administration mutually inclusive table, table entries are populated by determining whether a vertical feature must first be assigned to a subscriber line before a respective horizontal feature can be assigned to the line.

The administration feature interaction algorithm also uses data bit maps that have the basic layout as shown in FIG. 7 and previously described. The data bit maps include a subscriber feature bit map (described above) and a feature possible bit map. The feature possible bit map represents all the features available to the system 10 and is initialized to have all SET bits, i.e., all bits set to 'Y'. Finally, the administration feature interaction algorithm also performs data operations on the entries of the data tables and the data bit maps (i.e., bit map logical operations and bit map searching) to implement the algorithm steps.

FIG. 10*a* through 10*g* show an example of the operation of the feature interaction algorithm, the data tables, the data bit maps and data operations used by the administration software. During the operation of the administration software, the steps of the algorithm are implemented when a subscriber line characteristic is requested to be changed, for example, a new feature is requested to be added (or assigned) to the line. At this trigger point, the algorithm looks up, as a first step, the subscriber feature bit map, the administration blocked table and the feature possible bit map. In the example shown by the figures, the Call Forward Inhibit Make Busy (CFIMB) feature is requested to be assigned to the subscriber line at the trigger point (i.e., at the point of request during the execution of the administration software).

FIG. 10*a* shows the order of priority of the call features provided by the system 10 and FIG. 10*b* shows the ordered arrangement of the call features (indicated by the priority number) in the feature possible bit map. FIG. 10*c* shows the subscriber feature bit map that indicates the subscriber line is already assigned the Call Forward Variable (CFV) feature and FIG. 10*d* shows the administration blocked table for the call features. For each assigned feature in the subscriber feature bit map (only for CFV in the example shown), the algorithm performs an AND operation on the two remaining data sets, i.e., the respective row entry of the administration blocked table for the assigned feature and the feature possible bit map. Bits set to 'N' of the resulting bit map indicate features which are not allowed on the subscriber line due to already assigned features on the line. FIG. 10*e* shows the AND operation and the resulting bit map for the example.

During the second step, the algorithm checks the resulting bit map of the first step for the bit position of the new feature to be assigned. If the bit position of the new feature is set to 'N', the feature is not allowed and cannot be assigned to the line. In such case, the administration software rejects the request to have the new feature assigned to the line and discontinues the algorithm execution. If the bit position of the new feature is set to 'Y', the feature is allow able and may be assigned to the line. Thereupon, the algorithm continues its execution.

In the example shown, the algorithm checks bit position 7 representing the CFIMB call feature. The bit position is set to 'Y' indicating that the feature is not blocked by other call features and, thus, allowable and assignable to the line. Consequently, the administration software accepts the request to have the CFIMB call feature assigned to the line at this point and continues the algorithm execution.

During the third step, the algorithm looks up the subscriber feature bit map and the respective row entry for the new feature on the administration mutually inclusive table. FIG. 10f shows the administration mutually inclusive table for the call features. The algorithm first performs an AND operation on the two data sets and then performs an exclusive OR (XOR) operation on the resulting bit map of the AND operation and the same row entry of the administration mutually inclusive table. FIG. 10g shows the AND operation, the XOR operation, and the resulting bit map for the example.

During the fourth step, the algorithm checks the resulting bit map of the third step for SET bits. If the resulting bit map has any SET bits, the new feature cannot be assigned to the line because the feature(s) indicated with the SET bit is required but not available or currently assigned to another line. Thereupon, the administration software rejects the request to have the new feature assigned to the line and continues its operation in normal fashion until the next trigger point. If the resulting bit map has no SET bits (i.e., is an empty or null SET), the new feature can be assigned to the line. Thereupon, the algorithm directs the linking of the particular feature software to the administration software which then continues its operation in a normal fashion until the next trigger event.

In the example shown, the algorithm checks the resulting map bit of the third step and finds that bit position 8, representing the Make Busy Key (MBK) call feature, has a SET bit (i.e., set to 'Y'). Therefore, the new feature CFIMB cannot be assigned to the line because the MBK feature indicated with the SET bit is required but not available or currently assigned to another line. Consequently, the administration software rejects the request to have the CFIMB call feature assigned to the line and continues its operation until the next trigger point. Note that the administration software is normally designed to fully inform the system of all rejections and acceptances of requests to assign a new feature to the line.

In the event that there is more than one new feature requested to be assigned to the line at the trigger point, the algorithm may be configured to examine each of the feature requests at each step so as to continue its operation for those requests that are accepted at a respective step and to discontinue its operation for those requests that are rejected at the respective step. Alternatively, the algorithm may be configured to repeat its entire execution, whether or not the previous new feature request has been rejected or finally accepted, until all new feature requests are examined.

The embodiments described herein are merely illustrative of the principles of the present invention. Various modifications may be made thereto by persons ordinarily skilled in the art, without departing from the scope or spirit of the invention. For example, the algorithms can process an unlimited number of features and the data tables and bit maps can be of any size. Also, the algorithms can process any type of feature, although as noted herein, some features are not required to be implemented via the algorithms.

Also, the algorithms and the data tables and bit maps are not limited by the type of standard that defines how features interact (e.g., LSSGR for U.S. standards and CCITT for world market standards). Also, the algorithms and the data tables and bit maps can be applied to any call processing model and are independent of the type of physical switching system.

What is claimed is:

1. In a call processing system having a basic call processing program implementing a basic call chain and a plurality of feature programs optionally executed at a plurality of trigger points during execution of the basic call processing program, a memory for storing data relating feature services to the basic call chain, and a feature interaction control program that accesses the memory for storing, a method of implementing at least one feature service for a call connection between subscribers of the call processing system comprising:
   a. executing, at each trigger point, the feature interaction control program;
   b. determining, based upon data in the memory for storing, which feature services are available to be accessed at a respective trigger point during the execution of the basic call program;
   c. blocking certain available feature services from being accessed at the respective trigger point based on feature services that are currently accessed; and
   d. accessing, at the respective trigger point, each respective feature service which is available to be accessed and is not blocked, in a priority order for the feature services established at the most recent formatting of the system, the accessing further including:
      i. determining a highest priority ordered feature service that can be accessed at the respective trigger time;
      ii. performing a task by the basic call program that is directed by the stored data pertaining to the respective trigger time and to the highest priority ordered feature service;
      iii. blocking certain feature services, that are available to be accessed and that are not blocked by feature services that are currently accessed, from being accessed at the respective trigger time based on the stored data pertaining to the highest priority ordered feature service; and
      iv. repeating steps i, ii, and iii for the remainder of the feature services, that are available to be accessed at the respective trigger time and that are not blocked as a result of step iii, in succeeding priority order.

2. The method of claim 1, wherein the performing a task comprises accessing and executing by the basic call program of the highest priority ordered feature system.

3. In a call processing system comprising a processor operating both basic call software and feature software, and memory storing data pertaining to the interaction of the basic call software with the feature software, and feature interaction control software, a method of executing feature software comprising:
   a. executing, upon each feature request by the basic call software, the feature interaction control software having a first data operation to determine the respective call features that can be executed;
   determining a first common data set between a data bit map that defines the call features subscribed by the respective subscribers and a data table row that defines the execution of a respective call feature at the feature request; and executing a second data operation to inhibit certain respective call features from being executed based on call feature software that is currently being executed;

b. performing a data search of the noninhibited call features to determine the highest priority-ordered call feature; and c. executing the call feature software for the respective call feature determined to be a highest priority-ordered, said priority order being established prior to operation of the system.

4. In a call processing system comprising a processor operating both basic call software and feature software, and memory storing data pertaining to the interaction of the basic call software with the feature software, and feature interaction control software, a method of executing feature software comprising:

a. executing, upon each feature request by the basic call software, the feature interaction control software having a first data operation to determine the respective call features that can be executed;

determining a first common data set between a data bit map that defines the call features subscribed by the respective subscribers and a data table row that defines the execution of a respective call feature at the feature request and determining the entire data set between said common data set and a data bit map that defines the call features that execute other call features upon execution; and executing a second data operation to inhibit certain respective call features from being executed based on call feature software that is currently being executed;

b. performing a data search of the noninhibited call features to determine the highest priority-ordered call feature; and c. executing the call feature software for the respective call feature determined to be a highest priority-ordered, said priority order being established prior to operation of the system.

5. The method of claim 4, wherein the executing the second data operation comprises determining, for each respective call feature that can be executed, a second common data set between an entire data set that defines all the respective call features that can be executed and a first data table row that defines the blocking of a respective call feature based on call feature software currently being executed.

6. The method of claim 5, wherein the performing a data search comprises performing a bit map search of the second common data set between said entire data set and a blocking data table row.

7. The method of claim 5, wherein the executing the call feature software comprises executing, for the respective highest priority-ordered call feature, the action defined by a second data table row that defines the execution of a respective call feature at the feature request.

8. In a call processing system comprising a processor operating both basic call software and feature software, and memory storing data pertaining to the interaction of the basic call software with the feature software, and feature interaction control software, a method of executing feature software comprising:

a. executing, upon each feature request by the basic call software, the feature interaction control software having a first data operation to determine the respective call features that can be executed; and executing a second data operation to inhibit certain respective call features from being executed based on call feature software that is currently being executed;

executing a third data operation to inhibit certain respective call features from being executed based on the execution of the call feature software for the respective call feature determined to be the highest priority-ordered;

determining, for call feature software newly executed, a third common data set between said entire data set that defines the respective call features that can be executed and a data table row that defines the blocking of a respective call feature based on call feature software newly executed; and repeating the steps of executing a third data operation for each remaining call feature that is not inhibited in succeeding priority order;

b. performing a data search of the noninhibited call features to determine the highest priority-ordered call feature; and c. executing the call feature software for the respective call feature determined to be a highest priority-ordered, said priority order being established prior to operation of the system.

9. The method of claim 8, wherein the repeating comprises determining that the third common data set is not a null set.

* * * * *